Inventor:
Sterling P. Newberry
by Merton D. Moore
His Attorney

Inventor:
Sterling P. Newberry
by Merton D. Moore
His Attorney

MICROSPACE DATA STORAGE TUBE USING ELECTRON MICROSCOPE OPTICAL ASSEMBLY

Filed Dec. 30, 1960 3 Sheets-Sheet 3

Inventor:
Sterling P. Newberry
by Merton D. Morse
His Attorney

United States Patent Office 3,170,083
Patented Feb. 16, 1965

3,170,083

MICROSPACE DATA STORAGE TUBE USING ELECTRON MICROSCOPE OPTICAL ASSEMBLY

Sterling P. Newberry, Schenectady, N.Y., assignor to General Electric Company, a corporation of New York

Filed Dec. 30, 1960, Ser. No. 79,925
24 Claims. (Cl. 315—31)

This invention relates to a method and apparatus for storing data and more particularly to high density and high capacity storage. This application is a continuation-in-part of my copending application Serial No. 668,489 filed June 27, 1957, now abandoned.

Recording information in an easily accessible form and in the least possible volume is becoming one of the important, and in some cases crucial, requirements of our advancing technology. Computer technology and the field of automation, for example, demand ever-improved data storage devices in order to fulfill their promise and potential. Thus, the further improvement of computers is approaching an asymptotic limit for want of larger "memory capacity," which permits rapid access and has storage density of sufficient magnitude to permit utilization of storage elements of small physical dimensions. The inability of presently known systems to provide all of these desirable qualities of speed, capacity, and small physical size, presents a barrier of great magnitude to technological advances in these fields.

At present the technology has advanced to the stage where data storage systems are needed which are capable of storing $10^6$ bits of data or more per square centimeter which capacity is, at present, considered beyond practical limits. Of the presently available systems magnetic tape and magnetic drums have a maximum storage density of about 1000 bits/cm.$^2$ and consequently require approximately 1,000 square centimeters of storage for the desired capacity, which is prohibitively large. A further consequence of this low storage density is that a substantially long access time in the order of milliseconds is required to read out the stored data which makes such storage highly inconvenient in computers where immediate access to the data in a matter of a few microseconds is of prime importance. In addition, since such a large area of the magnetic tape must be scanned in order to have access to all of the data, temporary storage devices must be utilized to store the information obtained during the course of the readout.

Barium titanate cores, on the other hand, provide quick access time but are on the whole extremely complex when large storage capacities are required. That is, in order to utilize barium titanate cores for a large storage capacity an exceedingly complex wiring system must be provided which, with its large maze of lead wires, becomes increasingly cumbersome and unattractive. Thus, barium titanate cores for data storage are adequate as long as small storage capacities are necessary.

Electrostatic storage tubes comprise another of the important prior art systems for storing data. Such electrostatic storage systems although adequate for many uses are highly limited in storage volume. Though they are reliable and rapid they are limited to storing approximately 2,000 bits of data per storage tube and the only manner in which such electrostatic systems can have their total storage capacity increased is to use parallel units. However, in the range of storage capacity being discussed here; i.e., $10^6$ bits, it would be necessary to utilize 500 such tubes in parallel in order to achieve the required capacity. Thus, the limted storage volume per unit for such systems makes them entirely impractical in the area being discussed.

In addition, since electrostatic storage systems depend upon the secondary emission characteristics of a target a severe problem of charge redistribution on the surface exists which destroys the data representing discrete islands of potential in a matter of milliseconds unless restrained by low voltage holding beams to supply extra secondaries or the data is constantly rewritten. Thus, since these systems depend upon secondary phenomena rather than upon the primary effect of a particle beam, a relatively complex mechanism is necessary to achieve the desired reliability.

In order to achieve storage densities of the order of $10^6$ bits per square centimeter and higher, it becomes necessary to consider areas and individual storage sites which are so minute as to involve concepts and techniques which are beyond the realm of ordinary experience in this field. In order to differentiate such a storage system from those previously known, it is desirable to utilize a distinguishing appellation therefore. As a consequence, such storage shall arbitrarily be denominated as "microspace storage" through the remainder of this specification. By arbitrary definition "microspace" is an idealized two dimensional space associated with solid surfaces or "thin" solids, which has linear dimensions below the resolution capability of optical aides and consequently can only be resolved from another "microspace" by electron microscope techniques.

It has been discovered that it is possible to produce focussed charged particle beams, such as electrons, protons, ions, etc., having spot diameters in the order of 100 angstrom units or less (1 cm.$=10^8$ A. U.) which provide a means for storing data in storage sites having dimensions of merely a few hundred angstrom units or less. In addition, the extremely high resolving power of electron microscope optical systems, which now routinely resolve less than 20 angstrom units, provides a complementary means for reading back such stored data. In this fashion it is possible, in conjunction with improved storage media, to provide storage, conservatively speaking, of $10^{10}$ storage sites per square centimeter.

It is an object of this invention, therefore, to provide a data storage system having a storage capacity many orders of magnitude, even up to a factor of $10^6$, larger than any presently known.

A further object of this invention is to provide a data storage method and apparatus utilizing focussed particle beams produced by electron and X-ray microscope electronoptics for storage and readout.

An additional object of this invention is to provide a method and apparatus for data storage wherein the primary effects of a focussed beam of charged particles are utilized.

Another object of this invention is to provide a data storage element having data stored on discrete areas thereof by the primary effect of a focussed beam of charged particles.

A still further object of this invention is to store and read out data by the action of a focussed charged particle beam which does not impinge upon the storage element.

A yet further object of this invention is to provide a data storage system of such high storage density that access time, capacity, storage time, writing and readout time are bettered over those presently known.

Further objects and advantages of this invention will become apparent as the description of the invention proceeds.

In accordance with the invention the foregoing objects are accomplished by providing a microspace storage system which takes advantage of the intense minute particle beam probes developed by the electron optical systems of X-ray microscopes for storing the data, and the high resolving power of electron microscope optics for reading back the stored data.

In addition, storage elements are utilized which rely on the primary effects of the charged particle beams for storage. Discrete polarization of ferroelectric materials, lattice dislocation in a semi-conducting material, direct capture of charged particles on an insulating surface, polymerization of hydrocarbon vapors, chemical changes involved in photography, and the projection of foreign materials onto the storage surface, illustrate the various types of storage techniques which may be utilized.

The novel features which are believed to be characteristic of this invention are set forth with particularity in the appended claims. The invention itself, however, both as to its organization and method of operation may best be understood by reference to the following description taken in connection with the accompanying drawings in which:

Figures 1, 2, 3:
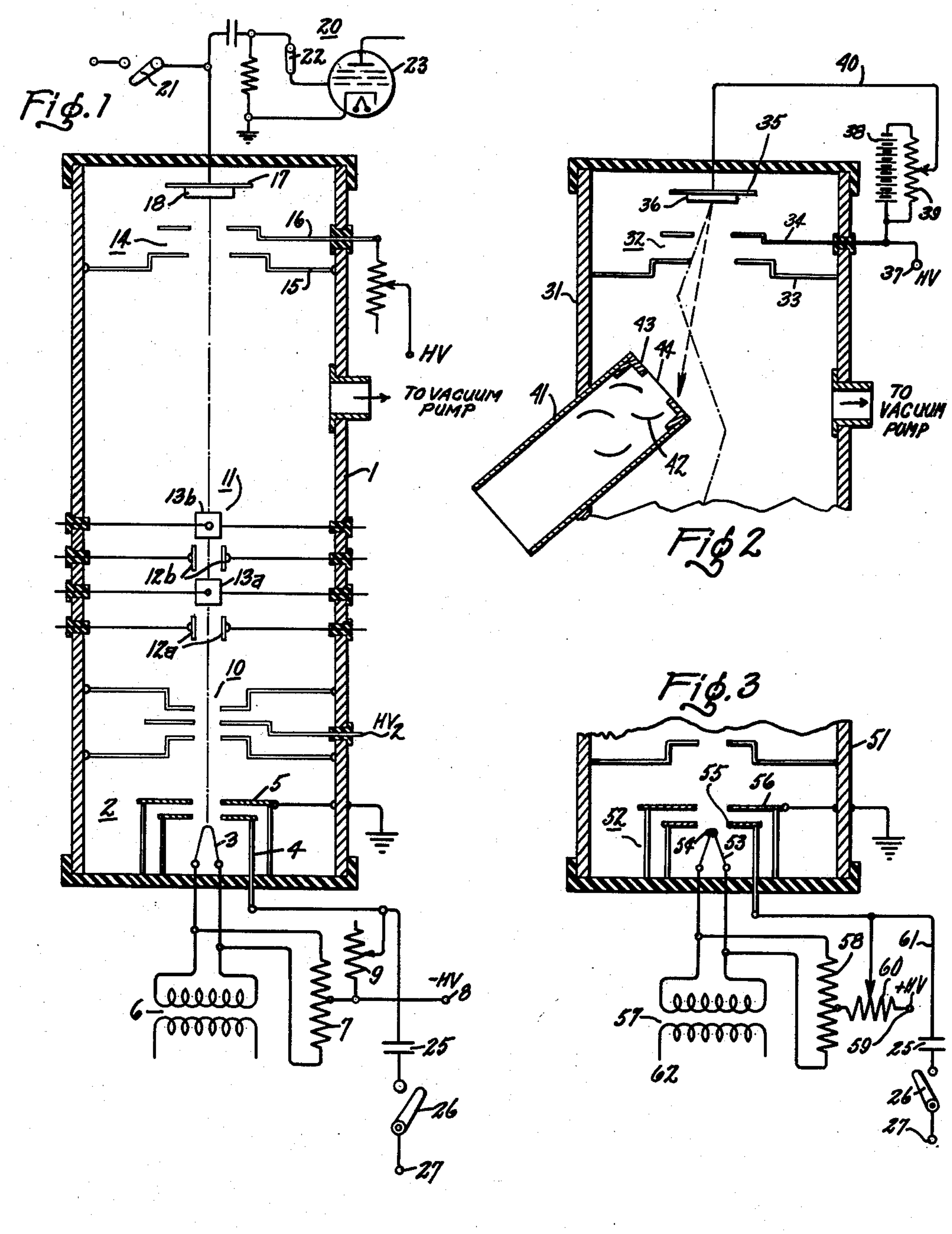
FIGURE 1 shows, schematically, a sectional view of the apparatus for producing the minute beams of focussed particles for storing and reading out the information.
FIGURE 2 shows a fragmentary sectional view of an alternative embodiment of the reading and writing apparatus of FIGURE 1.
FIGURE 3 shows a fragmentary sectional view of an arrangement for producing a beam of ionized particles which may be utilized in the instant invention.
Figure 11:
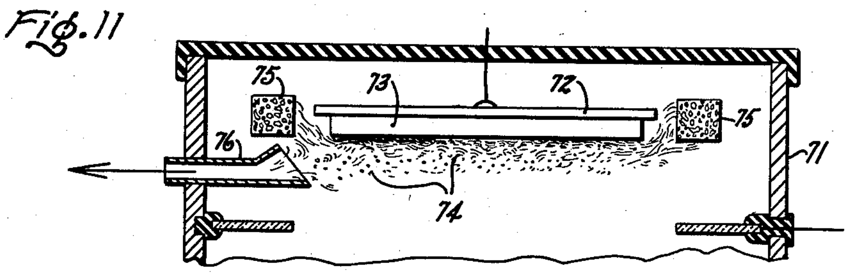
Figure 6:
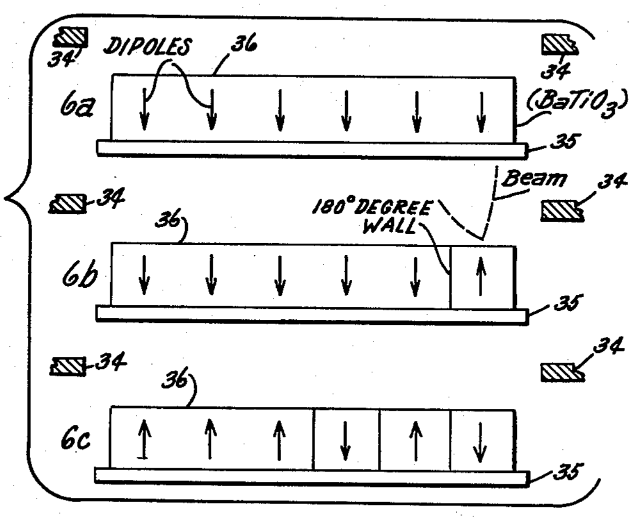
Figure 7:
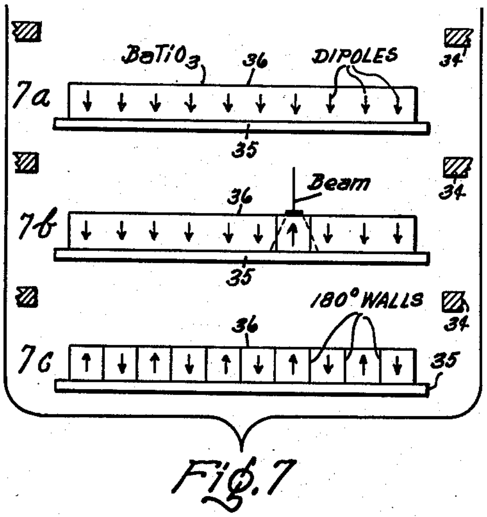

FIGURE 6 includes three diagrammatic illustrations *6a*, *6b* and *6c* showing the polarization effect of a focussed particle beam on a barium titanate storage element;

FIGURE 7, in views *7a*, *7b*, and *7c*, illustrates diagrammatically the effect of a directly impinging focussed particle beam on a barium titanate storage element;

FIGURES *8a* and *8b* illustrate diagrammatically the manner in which information stored on a polarized storage element may be read out by means of an instrument such as that illustrated in FIGURE 2;

FIGURES *9a* and *9b* illustrate the construction of photographic storage elements which may be utilized with the present apparatus;

FIGURES *10a* through *10c* illustrate schematically a storage element characterized by direct capture of particles from the focussed charged particle beam; and FIGURE 11 shows a fragmentary view of yet another alternative embodiment of the apparatus.

Referring now to FIGURE 1 there is schematically illustrated a data storage apparatus embodying the principles of the instant invention wherein a beam of charged particles is produced, focussed, and caused to act upon a data storage element to produce discrete data bearing portions in a matrix form. The apparatus of FIGURE 1 may alternatively be utilized to read out such stored data to produce a series of electrical output pulses representative of the stored data.

There is provided a suitable housing 1, illustrated in cross-section and preferably of cylindrical configuration, connected to a sutiable vacuum pumping system to maintain the housing under vacuum. Mounted in the lower portion of the housing 1 is a charged particle beam source 2 for producing, in the instant case, a beam of electrons, the beam source 2 consisting of an electron filament 3, an apertured blanking electrode 4, and an apertured accelerating electrode 5. The electrodes 4 and 5 are aligned over the filament 3 so as to form the emitted electrons into a beam of electron rays which are accelerated through the apertures.

The electron emitting filament 3 is connected to the secondary of a suitable transformer 6, the primary of which may be connected to a source of energy to provide the heater current for the filament. Negative potential for the filament with respect to a reference potential level such as ground is provided by means of a voltage divider 7 connected across the filament and operatively coupled to a terminal 8 maintained at negative high voltage (—HV). The blanking electrode 4 is connected to the terminal 8 by means of a rheostat 9 and is maintained negative with respect to ground. The electrode 4 is also connected to a circuit which periodically blanks the electron beam. The circuit, which provides a periodic voltage for blanking the beam, and its purpose will be discussed in detail later in conjunction with a description of the storage element and the manner of storing data thereon.

Disposed along the electron beam path is a collimating device which affects the trajectory of the electrons emitted from the source 2 and serves to bring these divergent electrons into a beam of substantially parallel or slightly convergent rays. To this end, a set of apertured electrostatic field producing lens elements indicated generally at 10 are positioned immediately above the electron beam source 2. Each of the elements of this assembly has its central aperture aligned along the electron beam path and functions to affect the electron trajectory so as to form an electron beam condenser lens assembly. The two outer members of this assembly are connected, as indicated schematically, to a reference potential such as ground by being connected to the grounded wall 1 of the housing of the tube. The central apertured element is connected to a source of field producing potential indicated at $-HV_2$ and in conjunction with the other elements of the assembly produces an electrostatic field acting upon the electron beam passing therethrough to achieve the desired trajectory modifying result.

Briefly speaking, the operation of the condenser lens assembly may be described by reference to the effect of the electrostatic field upon the electron trajectories. It can be stated that the condenser lens assembly serves to modify the electron trajectories to bend the electron rays into curved paths during passage through the assembly, and through this bending action functions to bring the group of divergent electron rays emitted from the source 2 into a beam of substantialy parallel or slightly convergent rays. Because of this characteristic action, the structure is termed a condenser assembly. For a more complete description of the manner in which such electrostatic field producing elements function as a condenser lens assembly, reference is made to the book Electron Microscope, by D. Gabor, published by the Chemical Publishing Company, Inc., 1948, Brooklyn, New York, and specificaly to Chapters 2 and 3 thereof. In addition, the book entitled Electron Microscopy, by V. E. Cosslett, Academic Press, Inc., Publisher, London and New York, (1951), contains an excellent discussion of the principles of operation of such electrostatic condenser lens assemblies. Disposed along the beam path and on the side of the condenser lens assembly away from the beam source is a beam deflection assembly 11 which deflects the electron beam in a predetermined manner and sequence both in the horizontal and vertical direction to scan said beam across the storage element target. The beam deflection assembly 11 comprises first and second horizontal deflection plate pairs *12a* and *12b* which produce a controllably varying electrostatic field to displace the electron beam in the horizontal plane in a predetermined manner to achieve the scanning of said storage element. Similarly, vertical deflection plate pairs *13a* and *13b* provide an electrostatic field to deflect the electron beam in the vertical plane. Two pairs, respectively, of horizontal and vertical deflection plates are necessary to insure that the electron beam passes through the center of the objective lens assembly for all sweep positions eliminating lens aberration problems. If but a single pair of plates were utilized, the beam deflection thus produced would cause the electrons to pass through the peripheral portions of lens apertures introducing aberration problems, which problem is here eliminated by applying deflecting voltages of opposite polarities to each pair of plates deflecting in a given plane. That is, each pair of deflection plates bends the electron beams in opposite directions to produce a resultant trajectory for any given sweep position which passes through the center of the objective lens assembly.

Sweep voltages applied to the respective deflecting plates 12*a*, 12*b*, and 13*a*, and 13*b* may be supplied in any suitable manner and from any suitable source to provide the desired scanning of the target surface in the horizontal and vertical planes. Thus, for example, the well known saw-tooth sweep may be utilized with a predetermined sweep frequency and synchronization when the apparatus is utilized to store information upon the target plate. On the other hand, when desired, the sweep voltages, and consequently the beam positioning, may be controlled directly from a utilization device such as a computer or the like. In addition, sweep voltages other than the common saw-tooth such as, for example, a step wave voltage such as is used in a flying spot scanning device, may be utilized in place of the saw-tooth depending on the type of sweep which is desired. Suffice it to say, however, the sweep voltages, their repetition frequency and configuration, are so chosen as to provide the desired scanning of the electron beam over a predetermined area in the horizontal and vertical plane.

Positioned at the end of the housing 1 opposite to the electron beam source and aligned along the electron beam path is an electrostatic objective lens assembly 14 which focusses the parallel electron rays of the beam. The objective lens assembly 14 modifies the trajectory of the electron rays and focusses the beam down to an extremely minute spot diameter and is constituted of a second set of apertured electrostatic field producing plates 15 and 16, the latter of which is connected to a source of very high negative voltage (—HV) with respect to ground and which is substantially that of the filament element 3.

Positioned at the focal pont of this objective lens assembly is a target structure containing a data storage element which is adapted to have information stored thereon by the primary effects of the focussed electron beam, as opposed to other effects such as secondary emission. To this end there is provided a conductive backing plate 17 having mounted thereon a storage element 18, which upon being struck by the focused electron beam has discrete areas thereof transfashioned by the action of said beam to differentiate them from the remaining or unaffected portions to produce a matrix of such discrete areas that is representational of the data to be stored. Since, as has been pointed out previously, electron-optic assemblies such as the objective lens assembly 14 demagnify and are capable of producing a focussed beam of extremely small spot diameter it is possible to produce data bearing discrete portions of the storage element which are of the order of magntiude of the spot diameters and are then resolvable only by similar electron-optic devices.

It is well known in the art that the lateral distance between two points in the same plane that can just be resolved by conventional optical means is approximately one-half a wavelength of the light used. The wavelengths of visible light fall between approximately 4000 and 7000 anstrom units, which means that the minimum separation of two resolvable points is not less than 2000 A. units. On the other hand, the wavelengths of beams of charged particles can vary down to less than one angstrom unit, depending on the voltage through which the beam has been accelerated. In practice, it is probable that the diameter of the focussed beam would be less than 400 angstrom units and would lie in the range between 100 and 300 angstrom units, although it is certainly possible to utilize a smaller diameter beam. For a discussion of optical resolving power, reference is made to Chapter VII of the The Principles of Optics, by Hardy and Perrin, McGraw-Hill Book Company, Inc., New York, N.Y., 1932, and Chapter 15 of Fundamentals of Optics, by Jenkins and White, McGraw-Hill Book Company, Inc., New York, N.Y., 1950.

Connected to the backing plate 17 is an output circuit 20 which may be selectively controlled so as to utilize the apparatus of FIGURE 1 alternately to store data and to read out such data. A pair of single pole, single throw switches 21 and 22 constitute, respectively, the storage and readout control switches which are selectively actuated during the storage and readout periods. The single pole, single throw switch 21 in its closed position connects the conductive backing plate to a suitable source of voltage which is slightly less negative than the filament of the electron gun and provides a source of potential to the backing plate 17 necessary during the recording portion of the apparatus. The single pole, single throw switch 22, on the other hand, is connected in the grid circuit of a tube 23 which amplifies the current pulses produced in the conductive backing plate 17 by the impingement of the electron beam on the discrete areas of the storage element 18 during readout. The amplified output pulses from the amplifier 23 may be then applied to any suitable utilization circuit such as a computer or the like.

The switches 21 and 22 are selectively actuated depending upon the type of operation desired. Although these switches are shown as individual single pole, single throw switches it is obvious of course that these switches may be ganged and interlocked to insure that the closing of one maintains the other in its open position. Furthermore, although these switches are shown as manually operated it is obvious that these switches may be externally actuated from a utilization apparatus such as a computer, or electronic switching devices may be used.

In order to store data on the element 18 it is necessary to produce a matrix of discrete areas which are selectively transfashioned by the primary effects of the focussed electron beam; the discrete portions representing data in binary form. Thus to fashion a matrix of this type it is necessary to blank the beam when one binary condition is to be stored and permit the beam to impinge on the storage element for the other binary control. For example, if arbitrarily it is decided that a transfashioned discrete area represents the binary "1" then, as a consequence, a non-transfashioned portion must represent the binary "0" condition and the beam must be selectively blanked.

To this end, the focussing and blanking grid 4 is connected, during storage, through a coupling capacitor 25, and a main control switch 26 to a terminal 27 which is connected to a suitably controlled source of blanking voltage such as a computer. The terminal 27 may, for example, be connected to a data output terminal of a computer producing binary information in the form of a "pulse" and "no pulse" train, which pulse train is then utilized to blank the electron beam.

In the event that the beam blanking is to be controlled directly from a computer, it may be desirable to synchronize the sweep voltages applied to the deflection plates 12*a*, 12*b*, 13*a*, etc., directly from the computer, in which case the computer clock pulse timing system may be utilized as a source of synchronizing pulses.

Control switch 26 is manipulated in an obvious manner to apply blanking voltage during storage and remove it during readout. Although the control switch has been illustrated for the sake of simplicity as manually operable, it is obvious that it may be automatically actuated from the computer itself or from a remote control panel or station.

The storage element 18, which is positioned at the focal point of the objective lens assembly 14 and constitutes the target for the beam, is so constituted that the impingement of the focussed electron beam upon discrete portions thereof transfashions them so as to differentiate them from the remaining or unaffected portions. A representational matrix of such discrete information bearing areas may be produced on the storage element which individual discrete areas have dimensions of the order of magnitude producible by the spot diameter of a focussed particle beam. The various materials utilizable as storage elements in an apparatus of this type must be characterized by the fact that they are capable of having discrete areas thereof transfashioned by the primary effects of a focussed charged particle beam, capable of localizing the effect of said charged particle beam so that the discrete areas are approximately of the dimensions of the spot diameter, and yet are rugged enough not to deteriorate under the effects, heating and otherwise, of such an intensed focussed particle beam. It has been found that a number of different materials and elements possess the necessary characteristics to be utilized as such a data storing medium or element.

It has been found that certain ferroelectric materials, of which barium titanate is an outstanding example, may be selectively polarized by means of such a focussed particle beam to produce selected areas which are polarized oppositely to the remaining portion thereof. In addition, it has been found that such ferroelectric materials have a very sharp transition line between oppositely polarized elements which is of great utility in localizing the effect of the particle beam and producing extremely minute discrete areas of opposite polarization.

In addition, it has been found that certain types of porous dielectric materials, such as glass for example, may be utilized in conjunction with such a focussed particle beam to produce the direct capture of particles from the beam on the insulating surface.

Certain semi-conducting materials when struck by a focussed charged particle beam suffer from crystal lattice dislocations at the point of impact, which dislocations are of extremely minute diameter and may be utilized to represent data.

The deposition or fixing of polymerized hydrocarbon vapor onto a surface by means of a focussed charged particle beam presents yet another approach to storing data in discrete areas on a surface.

The projection of a foreign material onto a storage element surface by means of an ion beam, the ions being of the selected material to be deposited, is an extremely effective approach to the instant problem by virtue of the fact that extremely minute amounts of such a foreign material may be deposited by means of this technique.

Lastly, photographic emulsions may be utilized as a storage element and selectively expose an unexposed area produced thereon having dimensions in orders of magnitude below those producible by light-optical techniques. By virtue of the small spot diameters obtainable in such charged particle beams the storing and readout of the information may take place in air-tight sealed units, thus eliminating the problem of dust and scratches which have hitherto limited resolution of data storage on photographic elements.

Each of the storage elements referred to briefly above has been discussed in a rather perfunctory manner in order to provide a brief but complete description of the apparatus illustrated in FIGURE 1. A detailed explanation of the composition, construction and functioning of these diverse storage elements will be provided later in conjunction with a description of the overall operation of such apparatus.

The apparatus of FIGURE 1 is essentially based on the principle that a focussed beam of electrons is caused to impinge on a storage element both to store the data and to read it out. By virtue of the direct impingement of the focussed electron beam on the storage element it may become necessary in the case of permanent storage, as will be understood by those skilled in the art, to rewrite the information on the storage element after a readout since direct impingement of the beam erases the stored data. Such re-writing is common, for example, in electrostatic tube storage systems where it is also necessary to re-write the information a fixed time after it has been erased by the readout. Circuitry for accomplishing this result is old and well known in the art and, in essence, does not constitute a portion of this invention. However, reference is made to it to orient this apparatus properly should certain types of utilization thereof be made.

In the apparatus of FIGURE 1, as has been pointed out above, both the storage of the information on the storage element as well as the mechanism for reading out such stored information is dependent upon the physical impingement of the focussed beam of charged particles, such as electrons, on the surface of the storage element. It may be desirable to utilize a system for storing as well as readout which does not depend upon impingement of the focussed beam on the storage surface.

Such an apparatus is illustrated in FIGURE 2 wherein the electric field produced by the focussed particle beam interacts with the storage element to store or readout data. To achieve this result the objective lens assembly is of the lens mirror type wherein the electrostatic field affects the trajectory of the electron beam in such a manner that the beam is focussed, but is reflected and returns through the lens assembly without impinging on the storage element. The apparatus of FIGURE 2 comprises a suitable housing 31 which is connected to a suitable vacuum pumping system for maintaining the housing under vacuum. The electron beam source, blanking circuit, condenser lens assembly, and sweep circuit of the apparatus of FIGURE 2 are identical to that illustrated with respect to FIGURE 1 and are, as a consequence, not illustrated in order to simplify the showing and description of this apparatus. However, it is to be understood that these elements function in the same manner described with reference to FIGURE 1 to produce a beam of electrons illustrated in FIGURE 2 by means of the dashed lines.

The objective lens assembly 32 and the storage element target assembly 36 are so constructed as to produce the desired electron beam focussing and trajectory manipulation. This objective lens assembly 32 is constituted of a set of apertured electrostatic field producing plates 33 and 34 which focus the beam of electrons in the vicinity of the target structure. The apertured plate 34 is connected to a suitable source of voltage through a voltage terminal 37 which is negative with respect to ground. The conductive backing plate 35, however, upon which the data storage element 36 is mounted is maintained at a potential very close to that of the filament and is slightly more negative than the apertured objective plate 34 thus producing an electrostatic field between the plates 35 and 34 which affects the trajectory of the focussed electron beam in such a manner that this beam approaches but does not impinge on the surface of the storage element. A source of voltage 38, such as a battery or the like, and a voltage divider 39 connected thereacross constitutes the biasing voltage for the storage element. A movable tap on the voltage divider 39 is connected by means of a suitable lead 40 to the backing plate 35 and thus maintains this backing plate at a potential which is negative with respect to that of the apertured objective lens plate 34. It is obvious by moving the position of the variable tap on the divider 39 the degree of bias which may be applied to the plate 35 may be controlled which, in turn, permits control of the closeness of approach of the electrons to the surface.

Extending into the housing 31 is an electrical pulse producing means illustrated generally at 41, which is positioned to intercept the reflected electron beam and provide a pulse output representative of the data on the storage element. Thus, an electron multiplying device 41 of standard configuration extends into the interior of the housing 31 and includes a cathode 42 and a number of dynode elements having secondary emission characteristics. A cover element 43 including an access control slot 44 aligned with the cathode 42 constitutes a means for controlling access of the electron beam to the electron multiplying device. Representative binary "pulse" and "no pulse" signals appear at the output of the multiplier 41 depending on the storage element influenced beam which either passes through the slot 44 or not.

In the apparatus illustrated in FIGURES 1 and 2 the charged particle beam consists of electrons; however, charged particles other than electrons may be utilized equally well to produce the desired results. Thus, it is possible to utilize beams of negative and positive ions, the latter definition including protons.

FIGURE 3 is a fragmentary showing of a source of positively charged metallic ions. There is illustrated a suitable housing 51 of precisely the same type disclosed and discussed with reference to FIGURES 1 and 2. Mounted in the lower portions of the housing is a positive ion beam source 52 including a filament 53 having a coating 54 containing an appropriate material such as lithium, sodium, or silver, for example, as a convenient ion source. Filament heating current to evaporate the ions is provided by means of a transformer 57, the secondary of which is connected to the filament 53 and the primary of which is connected to any suitable source of alternating current power. In addition, the filament 53 is maintained at a positive potential with respect to a reference potential such as ground by means of a voltage divider 58 connected across the filament and having a center tap connected to a terminal 59 of a high voltage source illustrated at +HV.

Positioned directly above the filament 53 is an apertured focussing and blanking electrode 55 which is connected to the source of positive potential +HV at the terminal 59 through a resistor 60. In this manner the blanking electrode 55 is maintained at a potential which is slightly more positive than that of the filament 53.

In addition, the blanking electrode is connected through a lead 61 to a source of blanking voltage for periodically interrupting the beam of ions.

Positioned above the focussing and blanking electrode 55 is yet another apertured electrode 56 which is aligned therewith and forms an accelerating electrode so as to form the emitted ion into a beam of ions which are accelerated to the various apertures and accelerated down the optic axis of the device. The accelerating electrode 56 is connected to the wall 51 of the housing which is maintained at a reference potential such as ground and thus in conjunction with the remainder electrodes of the ion source produces an electrostatic field which forms and accelerates the ions down the optic axis.

The circuit for generating these blanking voltages is of the same type as that illustrted and described with reference to FIGURE 1 and is, therefore, not illustrated and described again. However, it is to be understood that in any apparatus using a source of ions such a blanking pulse source will, of course, be utilized during the storage portion of the operation. The ion beam may project metallic ions onto the surface which ions lose their charge thereon and are caused to adhere to the surface of the storage element. The projected foreign material may then be detected by means of a mirror electron microscope arrangement such as illustrated in FIGURE 2 which has a sensitivity sufficiently high to detect the field due to contact potential between the foreign material and a metallic storage element or the charge difference if the storage element is a nonconductor.

Alternately, if the ion beam is accelerated sufficiently the beam may be utilized to provide dislocation of the lattice structure of a semi-conducting storage element by either removing atoms or adding foreign atoms thereto which dislocation may then be accentuated by means of a preferential etching agent to produce the discrete areas which may then be detected and resolved by an electron mirror microscope. An ion beam may also be utilized to produce an etching action which produces a series of discrete pits or holes on the surface thereof which again may be detected by means of the ultra-sensitive electron mirror microscope. The various types of storage elements and the manner in which their surface is affected to store data will be described in greater detail later when a more thorough description of the storage elements per se will be provided.

Although in the preferred embodiment illustrated in FIGURE 3 a coated filament is shown as the source of ions, it will be obvious to those skilled in the art that various other ion sources may obviously be utilized with the apparatus of this invention without going outside the scope thereof. Thus, for example, it is well known that radio frequency arc sources may be utilized to produce intense ion beams. For a more complete description of such a radio frequency arc ion source, attention is called to Simple Radio Frequency Ion Source, Review of Scientific Instruments, 27, pages 285–88, May 1956, in which a thorough description of such a source is provided.

Similarly, canal ray ion sources are well known to those skilled in the art for producing beams of positive ions. Such canal ray sources are essentially long, narrow canals leading from a pressurized enclosure containing a cold cathode discharge. A good description of such a device may be found in the Journal of Scientific Instruments, 32, page 407, October 1955.

In certain circumstances it may be equally feasible to use a proton beam in place of the ion beam referred to above. For example, in producing direct lattice dislocation in a storage element made of semi-conducting material, a proton beam produced by means of a gaseous discharge, as is well known to those skilled in the art, may be utilized in place of an ion beam.

In discussing the apparati of FIGURES 1, 2 and 3, the physical apparatus to produce the focussed particle beams was stressed and the storage elements per se were described with only sufficient detail to provide a complete picture. However, in order to understand the present invention fully and to grasp all of the implications thereof it is necessary to consider, in some detail, the storage elements, their construction, composition, and the mechanism by which the primary effects of a focussed charged particle beam are utilized to transfashion discrete portions of the element.

Figure 4:
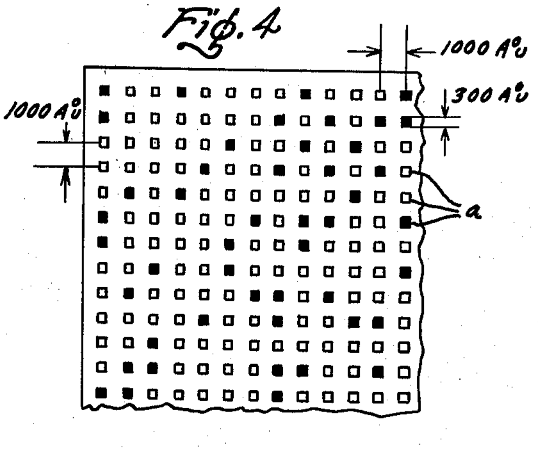
FIGURE 4 is a diagrammatic illustration of an information matrix.

As has been pointed out by utilizing the electron-optics (that is, condenser and objective lens assemblies) similar to those of electron and X-ray microscopes, it is possible to obtain focussed charged particle beams having extremely small probe diameters of the order of 100 angstrom units or less. The implications of this small spot size may not be immediately apparent; however, even a very conservative use of this resolving power can mean an *increase* in the efficiency of storage by a factor of $10^6$. Thus, for example, as illustrated in FIGURE 4, if the spot size is taken at 300 angstrom units, a very conservative utilization of the beam diameter, and if the spots are placed 1,000 angstrom units apart both in horizontal and vertical direction, it is then possible to store $10^{10}$ such recording sites in an area of 1 square centimeter. A storage element having a storage density of this order of magnitude may easily be read out by means of a 100 angstrom unit diameter beam having a 50 angstrom unit reading resolution, a most conservative utilization of electron microscope optics resolution since it is now possible routinely to resolve less than 20 angstrom units. Thus, as illustrated diagrammatically in FIGURE 4, a storage element having a matrix of discrete areas *a*, with the desired storage densities, is possible if adequate media are available which can be selectively transfashioned by the primary effect of a focussed charged particle beam.

*Permanent dielectric polarization*

One of the materials found to be particularly effective for use as a microspace storage medium is a class of crystalline mateirals known as ferroelectrics. One of the best known of these materials, and the one with reference to which discussion shall take place, is barium titanate ($BaTiO_3$) although other materials exhibit the same property and may equally well be utilized. The ferroelectric behavior of crystalline materials such as barium titanate is of sufficient importance to an understanding of the invention that a discussion thereof is in order. The name "ferroelectric" illustrates the fact that the electrical properties of such materials are analogous to the magnetic properties of ferromagnetic materials. That is, ferroelectric materials exhibit the same sort of non-linear relationship between electric polarization and an applied electric field as do ferromagnetic materials between magnetic induction and magnetomotive force.

Figure 5:
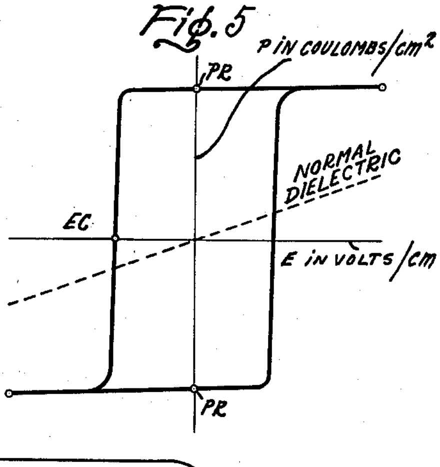
FIGURE 5 is a diagrammatic showing of the ferroelectric hysteresis loop of a dielectric storage medium material such as barium titanate.

FIGURE 5 illustrates polarization plotted along the ordinate against applied electric field as the abscissa for a material such as barium titanate. It can be seen from inspection that the curve is in the form of the familiar hysteresis loop. The intersection of the curve with the ordinate, PR, is termed the remanent polarization while the horizontal intercept EC is known as the coercive field. The non-linearity of the ferroelectric effect can be most easily seen in comparing it to that of a normal dielectric, illustrated by the dashed line, wherein a straight line (the slope of which measures the electric susceptibility or dielectric constant) is obtained.

The hysteresis effect in barium titanate is observed only below the Curie temperature of 123° C. and in single crystals of the material over a region wherein the electric dipoles lie perpendicular to the surface of the crystal. Barium titanate crystals having the electric dipoles lying perpendicular to the crystal surface are known in the art as c-Domain barium titanate. This type of orientation places the dipoles parallel, or anti-parallel, to the electric field when a potential is applied across the crystal surfaces depending upon the relative polarization of the individual dipoles in the crystal; each dipole, of course, having a positive and negative element. Domains in which the dipoles are parallel to the crystal surface, on the other hand, are known as a-Domains and their behavior does not differ materially from that of a normal dielectric.

The second characteristic of ferroelectric materials is the fact that in ferroelectrics there are only two stable states with respect to the polarization of the individual electric dipoles in a domain. Thus, if a dipole is initially positively polarized as illustrated at the point +PR of FIGURE 5, and an electric field is applied which is gradually increased from zero to —EC, no appreciable change in polarization occurs until —EC is reached. At this point the dipole almost instantaneously "flops over" and becomes negatively polarized. Such a situation, it will be appreciated, is readily applicable to a binary type storage system since the two stable states can easily be utilized to represent the binary "1" and "0." The above described switching action of the dipole may affect any number of dipoles within the domain, this number being dependent only upon the area over which the applied field obtains a value of EC. Thus, it can be seen that by reducing the area over which the field is changed it is possible to reverse the polarization of very few dipoles at a time and, theoretically, but a single dipole. Thus, this type of ferroelectric material is useful with focussed beams of charged particles such as may be produced in the apparati of FIGURES 1, 2 and 3.

The third characteristic of ferroelectric materials and one which, in conjunction with the ability to reverse the polarization of minute quantities of dipoles, makes it such a useful storage element, is the presence of very distinct boundary conditions between dipoles of opposite polarizations, boundaries which are extremely minute in size. Boundaries between regions in which the dipoles within a domain are oppositely polarized are termed 180° walls which, in turn, will be more understandable if considered in view of the earlier parallel and anti-parallel denomination. This boundary or transition area between the dipoles, in contrast with the gradual transition present between oppositely polarized regions within a magnetic material, has been calculated to be as little as only 1 lattice constant or about 4 angstrom units. Considering this small wall thickness, only a few angstroms in barium titanate, a system having a storage density of $10^{10}$ sites per square centimeter and requiring a resolution of only 50 angstrom units is possible using this material as a storage element.

Referring to FIGURES 6*a* through 6*c*, there is shown a diagrammatic view of a barium titanate storage element in conjunction with certain of the other elements of the apparatus of FIGURE 2 to explain the mechanism of storing data by means of a reflected electron beam which approaches but does not impinge upon the storage element. FIGURE 6*a* illustrates a barium titanate storage element 36, prior to data storage, mounted upon a conductive backing plate 35 and positioned behind the objective lens element 34 (shown partially broken away). That is, it is a c-Domain crystal in which all of the dipoles have been polarized, by means of an electric field applied thereto prior to utilization, in a single direction, a condition illustrated diagrammatically by means of the series of arrows. Each arrow, as a convention of the art, indicates the positive element of the dipole by means of the arrowhead and the negative element by means of the tail. Since all of the dipoles are polarized in the same direction in FIGURE 6*a*, no 180° walls exist and a homogeneous condition pertains throughout the element.

FIGURE 6*b* illustrates the effect of an approaching electron beam upon one of the dipoles at the right hand end of the barium titanate element. The focussed charged particle beam, as was explained with reference to FIGURE 2, is brought close to the surface of the barium titanate by means of the electrostatic field existing between the element 34 and the backing plate 35 and returned just before reaching the surface. The effect of the electron beam and the field thereof causes the dipole to "flip over" if the applied field attains a sufficient value. Consequently there exists in the barium titanate storage element a polarized dipole element having a polarization opposite to that of the dipole adjacent to it, bringing into existence a 180° wall as illustrated in this figure. By scanning the beam selectively both in the horizontal and in the vertical direction and by blanking in a predetermined sequence, it is clear that it is possible to produce a series of discrete areas of opposite polarization which discrete areas may be arranged in a binary matrix representing the information to be stored, a condition illustrated in FIGURE 6*c*.

In FIGURES 7*a* through 7*c*, on the other hand, the reversal of the dipole polarization in order to produce discrete areas representative of the stored information is achieved by the direct impingement of an electron beam upon the surface of the barium titanate storage element. FIGURE 7*a* again illustrates a barium titanate storage element mounted on a conductive backing plate and positioned behind one apertured element of an objective lens assembly of the type illustrated in FIGURE 1. As in FIGURE 6*a* the barium titanate is of the c-Domain type and all the dipoles therein are oriented in the same direction by application of an electric field prior to storage. In FIGURE 7*b* there is illustrated a beam of electrons striking a single spot on the surface of the barium titanate element which piles up charge at the surfaces within this discrete area which produces in the backing plate a spreading field of conical configuration, as illustrated by the dotted line, through the body of the barium titanate. That is, the electrons pile up in the one spot for a sufficient time until its potential is sufficiently different from the backing plate potential to cause polarization of all of the dipoles within the area to cause reversal of the polarization. This basic storage process of barium titanate is a discontinuous function of the electric field and thus only in those areas where the applied field attains a value of EC will the polarization reverse. Thus, once again it is possible to produce discrete areas of opposite polarization within the barium titanate storage element by sweeping the electron beam across the surface in a horizontal and vertical direction and by pulsing the beam in a predetermined sequence to control the precise polarization. FIGURE 7*c* illustrates, diagrammatically, such barium titanate storage elements having the desired data representing selective polarization.

FIGURES 6 and 7 illustrate the manner in which data is stored on a barium titanate storage element by selectively changing the polarization of discrete areas thereof in response to a reflected focussed charged particle beam and an impinging focussed charged particle beam, respectively. FIGURES 8*a* and 8*b*, on the other hand, illustrate the mechanism taking place during the readout from a barium titanate storage element utilizing a reflected electron beam in an apparatus of the type illustrated in FIGURE 2. FIGURE 8*a* shows a barium titanate storage element 36 having discretely polarized areas thereon representing stored information and illustrated by means of the arrows to indicate the direction of polarization of each of the respective areas. An electron beam *e* is shown approaching one of these discrete polarized areas, and in particular one in which the negative element of the dipole is near the surface thereof.

Positioned to intercept the reflected electron beam is an electron multiplying device 41 having an access controlling aperture 44 which determines whether that beam impinges upon the secondary emissive cathode 42 to produce an output pulse. In the particular example of FIGURE 8*a*, the electron beam *e* as it approaches the surface of the barium titanate storage element is repelled by the negative end of the dipole since it is of the same sign as the beam electrons. As a consequence, the trajectory of the repelled beam is such as to make a relatively narrow angle $\alpha$ with the optical axis of the beam as it is reflected. It is obvious, of course, that the greater the repelling force between the beam and the polarized area of the barium titanate, the sharper the angle $\alpha$ will become and the closer to a 180° reversal of the beam is possible. The access aperture 44 is, in this example, so positioned relative to the trajectory of the beam that it passes through striking the cathode 42 and emitting a number of electrons which in conjunction with dynodes produce an output pulse.

In FIGURE 8*b*, on the other hand, the situation is illustrated wherein the readout beam approaches a discretely polarized area opposite in sign to that of FIGURE 8*a*. In this circumstance the polarized dipole has its positive element near the surface and as a consequence tends to attract the negatively charged electrons of the focussed beam and affects its trajectory so that the beam is deflected by the angle B as shown. The cover 43 and slot 44 are so positioned that the beam does not pass through the slot and onto the cathode 42 for this trajectory and there is no output from the electron multiplier device. Thus, there is produced a series of pulses in binary form (i.e., "pulse" or "no pulse") representative of the respective discrete areas of stored information.

Figure 8:
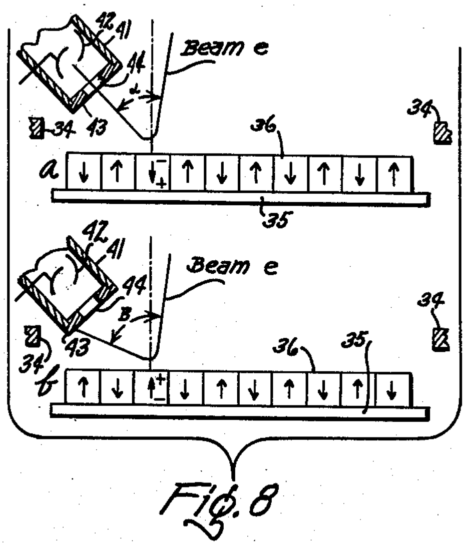

In describing FIGURE 8 as representing the use of a reflected electron beam to read out information by affecting the trajectory of the beam, the description of the mechanism was deliberately circumsribed for the sake of simplicity of explanation. However, it is obvious that such a reflected beam may be utilized to read out stored information by utilizing a more intense beam, the electric field of which then reverses the polarization of the respective dipoles and thereby induces current pulses in the metallic backing plate. In this fashion pulse trains representing the stored information are taken from the backing plate rather than from a photomultiplying device such as is illustrated in FIGURE 8, and applied to a pulse shaping and amplifying device and thence to a load.

Alternatively, by controlling the closeness of approach of the reflected beam to the surface of the storage element, it is possible to induce current pulses of different amplitudes, depending on the polarization in the backing plate, without actually reversing or "flipping" the dipoles. Thus, the focussed reflected electron beam may be utilized in diverse ways both to store information upon an element as well as to read it out. It is to be understood, however, that if the reflected beam is utilized to read out by means of flipping the polarized dipoles, it then becomes necessary to provide a regenerating or restoring circuit for the data where this data is to be of the permanently stored type.

Similarly, when utilizing a directly impinging readout system it is possible to produce output pulses in the backing plate by either reversing or "flipping" the polarization of some of the dipoles or by merely inducing current pulses of different amplitudes without actually reversing the polarization. That is, if the beam is intense enough to produce a field of the necessary magnitude certain of the dipoles will have their polarization reversed and other of the dipoles will not, thus inducing current pulses of different amplitudes which constitute the pulse train in a binary form. However, even if the intensity of the beam is not sufficiently high to produce the field necessary to reverse the polarization, it has been found that there will be induced in the backing plate current pulses of different amplitudes determined by the polarization of the respective areas. It is clear that if a beam of sufficient intensity to reverse the dipoles is utilized there must be provided a regenerative system to rewrite the original information on the surface of the storage element if permanent storage is desired. However, if the non-erasing impinging readout beam is utilized, no regeneration of the information is needed since the information is not erased by the readout beam.

From the previous description it can be seen that ferroelectric materials, of which barium titanate is merely a preferred example (others such as Rochelle salts being utilizable), present a storage element of extreme flexibility, accuracy and efficiency.

*Photographic emulsion storage element*

An alternative storage element which may be utilized with focussed charged particle beam storage and readout devices is one which takes advantage of chemical changes produced on the surface of the storage element by virtue of the primary action of the electron beam. One highly specialized and well-developed form of chemical process is that of photography. The photographic process includes the additional element of amplification (development) which sets it apart from other chemical methods. A photographic emulsion utilized as a storage element may have selective areas thereof exposed by means of a focussed electron beam to produce a latent image of photolyzed silver in the photographic emulsion. It is not necessary to depend upon vacuum to hold the electrons since the latent image produced in the emulsion is not formed of electrons but by the released silver atoms of the emulsion. By utilizing focussed charged particle beams to produce the exposed areas it is possible to produce storage sites which are substantially smaller than the resolution limit of optical systems which have hitherto been utilized to produce exposure.

However, in order to use such a focussed charged particle beam to expose selective areas and store data, it is necessary to utilize photographic elements which are of different construction than those normally used with light. The normal photographic element consists of a thin emulsion of silver halide which is covered by a protective coating of gelatin. The presence of the protecting coat of gelatin however brings about serious problems in utilizing such photographic elements with focussed electron particle beams. That is, in order to get both the storing and readout beams through the gelatin layer a very high intensity beam is necessary and, as a consequence, produces serious heating problems in the storage element which tend to destroy or at least damage it. In addition, the scattering effect upon the electron beam due to the gelatin is sufficiently serious to virtually destroy the resolution. As a consequence, it is necessary to utilize photographic elements which are so constructed as to avoid these problems.

Figure 9:
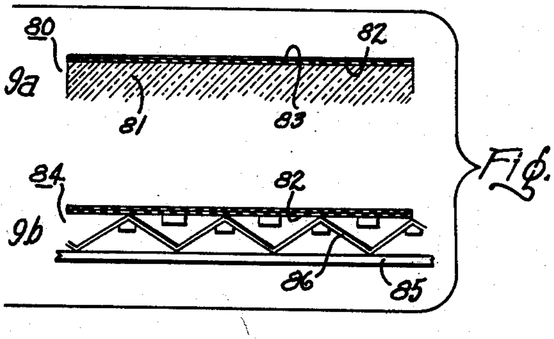

FIGURE 9*a* illustrates one embodiment of a suitable photographic storage element which may be utilized with a focussed charged particle beam for storing and reading out data. The photographic storage element 80 consists of a solid supporting base 81 which is illustrated as being of glass although other materials such as metals may be utilized. Positioned on the surface of the backing material 81 is a very thin layer of gelatin material 82. Superimposed on the surface of the gelatin layer 82 is a layer of silver halide emulsion 83 which is thus directly accessible to a focussed charged particle beam. Photographic elements of this type are available commercially and are produced by the Eastman Kodak Company for ultraviolet spectroscopy. They are known as the SWR series and have emulsions which may have sensitive particles as small as 100 angstrom units.

The impingement of a focussed beam of charged particles on the emulsion 83 will expose the areas thus struck and release silver atoms from the silver halide emulsion, producing discrete exposed areas which are substantially smaller than any heretofore obtainable by optical exposure. These areas may be in the order of 3,000 angstrom units, permitting storage densities of the order of $10^8$ storage sites per square centimeter. One of the leading advantages accruing from such a high storage density upon a photographic storage element is that the storage element may now be susceptible to special handling such as hermetic sealing, so that the resolution is no longer circumscribed by film scratches and dust particles as they are when optical devices are utilized. This is in contrast to known optical storage methods, where the storage density is so low that a relatively large area must be utilized in order to store sufficient data. As a consequence, special handling of the storage element is impossible and the resolution is limited by film scratches and dust particles inherent in any system in which the element is not sealed.

The photographic storage element 80 illustrated in FIGURE 9*a* may have data stored thereon by means of an apparatus such as is illustrated in FIGURE 1 whereas the readout of information stored thereon may be accomplished by means of an electron mirror microscope apparatus similar to that illustrated in FIGURES 1 and 2.

FIGURE 9*b* shows an alternative embodiment of a photographic storage element adaptable in particular for utilization with a transmission type of electron microscope. For utilization with a transmission type electron microscope it is necessary to place the emulsion in gelatin on a grid structure in order that the focussed particle beam may be permitted to pass completely through as is well known in such devices. Thus, there is provided a grid supported photographic storage element 84 consisting of a rigid frame element 85 supporting thereon a grid structure 86 shown in cross section. A very thin layer of gelatin 82 is positioned on the surface of the grid structure 86 and in turn supports a thin layer of silver halide emulsion, of the same order of magnitude as the desired resolution, which is thus directly accessible to the focussed charged particle beam.

*Direct capture of electrons by an insulating medium*

Figure 10:
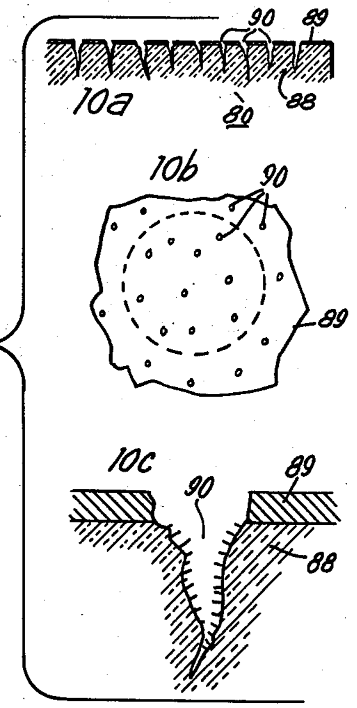

Direct capture of electrons from a focussed beam by an insulating material having a large number of charge retaining depressions on the surface thereof provides another very effective approach to storage. FIGURES 10*a* through 10*c* constitute a greatly enlarged showing of various features of such a storage element. The storage element consists of an insulating material 88, as illustrated in FIGURE 10*a*, such as glass, having a multiplicity of small pores or holes 90 scattered over the surface thereof. The pore members 90 are of approximately molecular dimensions, in the order of 50 angstrom units in diameter, and directly capture electrons.

Positioned on the surface of the insulating material 88 is a charged redistribution preventive means 89 constituted of a thin layer of a non-corrosive metal such as, for example chromium or platinum. The charge redistribution preventive means 90 is necessary in order to reduce redistribution of the charge pattern due to secondary electrons which are produced by the bombardment of the particle beams. Such secondary electrons tend to redistribute themselves over the surface of the insulator 88 and would destroy the discrete areas of charge built up in the various pore members 90 if not conducted away by means of the metallic redistribution preventive means 89. Furthermore, the bombardment of an insulating surface tends to produce a surface charge which again causes redistribution and destruction of the discrete charging of the dielectric. Hence, by depositing such a thin layer of metal on the surface and electrically connecting it to ground or another source of reference potential all of the secondary electrons and surface charges are led away and are not permitted to interfere with the charge produced by the capture of electrons within the pores or depressions 90.

The depressions 90, as are illustrated more clearly with reference to FIGURE 10*b*, are small compared to the beam diameter and are numerous enough so that several are included within a beam diameter at any arbitrary location. Thus, the impingement of the focussed beam spot upon the insulator permits a number of such pore elements 90 to capture electrons and produce a more sharply defined discretely charged group of pores.

The porous insulating material 88 which constitutes the basic material for capturing electrons from the focussed beam may be constituted of a boron silicate glass such as the type known by the trade name "Pyrex" which is put through a leaching process to remove the boron compound therefrom, leaving practically pure silicon dioxide and small porous holes or depressions of approximately molecular size around the order of 50 angstrom units in diameter. Such a porous glass is available commercially as an intermediate product in the production of glass known by the trade name of "Vycor" ware. Both "Pyrex" and "Vycor" are manufactured by Corning Glass Works, Corning, New York.

The charge redistribution preventive means 89 positioned on top of the glass and intermediate to the pores may be produced by a standard vacuum vapor deposition technique. In order to insure that the metal is deposited on the surface only and not within the pore members themselves, it is necessary that the vapor be deposited at a very low angle relative to the surface of the glass to achieve the desired result.

*Altering surface of storage element by means of an ion beam*

It is also possible to utilize a focussed ion beam to manipulate and transfashion the surface of a storage element by the deposition of a foreign material thereon. Thus, by forming a positive ion beam of sufficient energy and constituted of metallic ions such as, for example, lithium, sodium, or silver, the ions upon striking the surface, which may be either metallic or dielectric, lose their charge and remain on the surface as very small areas of foreign material bonded to the storage material. If the backing material constituting the storage element is maintained at a relatively low temperature, around room temperature for example, these areas of foreign particulate matter are actually physically bonded to the storage element.

If the storage element is constituted of a conductive, metallic material, and discrete metal on metal areas are produced by the ion beam, an electron mirror microscope of the type indicated generally in FIGURE 2 is sufficiently sensitive to detect the contact potential difference between the storage element and the foreign elements bonded thereto and provides a means for distinguishing these discrete areas of foreign material. If, on the other hand, the foreign metallic particles are deposited on an insulating or dielectric storage element an electron microscope of the mirror type is still sufficiently sensitive to detect the charge difference due to the ions.

If a negative ion beam is utilized, constituted of ions such as chlorine or bromine, these ions will react chemically with the surface to produce discrete areas of different configuration from the remainder of the surface by what essentially constitutes an etching or pitting process. Thus, as has been described above, either a positive or negative ion beam may be utilized to alter the surface of the storage medium.

Certain semi-conducting materials are susceptible to severe lattice dislocations if bombarded by an intense focussed ion or proton beam. These semi-conducting materials, some examples of which are germanium, silicon, and lithium fluoride, are subjected to lattice dislocation damages by either knocking out atoms of the semi-conducting materials or by adding foreign atoms and depressing those originally at the surface. In addition, it has been found that certain specific etchant materials act preferentially to etch only the disturbed portion of the lattice and thus produce discrete portions which differ from the remainder of the surface by producing small holes or pits at the site of the lattice dislocation. Such an etchant, for lithium fluoride and germanium, for example, is constituted of:

100 parts by volume of concentrated hydrofluoric acid
100 parts glacial acetic acid
160 parts concentrated nitric acid
2 parts liquid bromine and is described in an article by Gilman et al. in the Journal of Applied Physics, volume 27, p. 1018 (September 1956). Such pitting may then be detected by means of an electron mirror microscope construction of the type illustrated in FIGURE 2.

One of the advantages of ion induced lattice dislocation data storage is that chemical amplification is achieved by virtue of the etchant action which multiplies the original effect and increases the magnitude of the readout. It can be seen, of course, that where immediate access to the stored data is desired the lattice dislocation approach cannot be utilized since, obviously, the storage element must first be prepared by the additional step of etching. However, where permanent storage is desired and immediate access to stored information is not pressing, the lattice disturbance method is a highly desirable and feasible one.

*Polymerization of hydrocarbon vapors*

Another very attractive method for storage of data in microspace on the surface of a storage element is the depositing or fixing of minute areas of polymerized hydrocarbons on the surface of the storage medium by bombarding a hydrocarbon vapor by a focussed charged particle beam. FIGURE 11 illustrates a construction for producing such fixed hydrocarbons. It has been found that when benzene and other pure hydrocarbon vapors are irradiated by means of a focussed charged particle beam there is deposited at the surface a minute area of a waxy solid material which adheres firmly to the surface and which is believed to be a polymerized product of the hydrocarbon vapor. FIGURE 11 illustrates, schematically, a construction for producing such hydrocarbon vapors in the vicinity of the surface of a storage element which vapors are then fixed on the surface of the storage element by means of the focussed charged particle beam.

A suitable housing 71 of the type illustrated with reference to FIGURES 1 and 2 is provided and which is maintained evacuated by any suitable means. Suitable electron optical lens assemblies and particle sources are provided to produce a focussed beam of charged particles which, for the sake of simplicity and description, will be assumed to be electrons. Positioned at the end of the housing is a storage element 73, in the instant case a metallic substance, mounted on a fixed backing plate 72. Positioned adjacent to the storage element and the backing plate is a porous storage element 75 saturated with the desired hydrocarbon. The storage element 75 may constitute for example, clay or a sintered metal which by virtue of its porous structure is adapted to be saturated with the hydrocarbon. The saturated hydrocarbon in the element 75 escapes therefrom in the form of a vapor by virtue of the extremely low vapor pressure in the evacuated housing. Thus, a hydrocarbon vapor mist 74 is present at the surface of the storage element 73 which, when struck by the electron beam, is deposited or fixed to the surface of the storage element as a solid, waxy substance. By scanning the electron beam across the surface of the storage element 73 and properly pulsing the beam in a predetermined sequence, there can be deposited on the surface of the storage element a representational matrix constituted of these small discrete areas of solid waxy substance, which are believed to be polymerized hydrocarbons.

In order to prevent the hydrocarbon vapor at the surface from diffusing downwardly towards the remaining electron assemblies and the source of electrons and possibly coating the same and interfering with their function, there is positioned adjacent to the storage element an exhaust funnel 76 extending through the housing 71 and connected to any suitable source of vacuum, such as a pump, which removes any excess vapor from the surface of the storage element preventing the diffusion thereof into the rest of the apparatus.

The information thus stored on the surface of the storage element in the form of these discrete areas of waxy polymers may then be read out by means of an electron mirror microscope, previously described, which has a resolution sufficiently high to distinguish between the area and the remainder of the storage surface.

It can now be seen, from the description preceding, that the disclosed apparatus and methods for storing and reading out data in conjunction with various storage elements provide means for storing data in areas so small and with storage densities so large that they constitute a concept which is far removed from presently known storage means.

While particular embodiments of this invention have been shown it will, of course, be understood that it is not limited thereto, since many additional modifications both in circuit arrangement and in the instrumentalities employed may be made. It is contemplated by the appended claims to cover any such modifications as fall within the true spirit and scope of the invention.

What I claim as new and desire to secure by Letters Patent of the United States is:

1. In a data storage system, the combination comprising an electron microscope optical system including at least a source of charged particles and an objective lens assembly for producing a high density beam of charged particles focussed to a diameter below the lateral resolution of visible light optical devices, and a data storage element disposed substantially at the focal point of said beam, said storage element being exposed to the action of said beam to alter the characteristics of said storage element at discrete positions in response to the primary effects of said beam.

2. In a data storage system, the combination combination comprising an electron microscope optical system including at least an electron source and an objective lens assembly for producing a high density beam of charged particles focussed to a diameter below the lateral resolution of visible light optical devices, a data storage element disposed substantially at the focal point of said beam in position to be exposed to the action of said beam to alter the characteristics of said storage element at discrete positions in response to the primary effects of said beam, and means for reflecting said beam before it strikes said storage element.

3. In a data storage system, the combination comprising an electron microscope optical system including at least an electron source and an objective lens assembly for producing a high density beam of charged particles focussed to a diameter below the lateral resolution of visible light optical devices, and a data storage element disposed substantially at the focal point of said beam, said storage element being exposed to the action of said beam to produce charged areas on said storage element at discrete positions in response to the primary effects of said beam, said focussing means focussing said beam directly on said storage element whereby charged particles are captured to produce said charged areas.

4. In a data storage system, the combination comprising an electron microscope optical system including at least a source of charged particles and an objective lens assembly for producing a high density beam of charged particles focussed to a diameter below the lateral resolution of visible light optical devices, and a semiconducting data storage element disposed substantially at the focal point of said beam, said storage element being exposed to the action of said beam to produce discrete areas of lattice dislocation in said storage element in response to the primary effects of said beam.

5. In a data storage system, the combination comprisan electron microscope optical system including at least an ion source and an objective lens assembly for producing a high density beam of positive metallic ions focused to a diameter below the lateral resolution of visible light optical devices, and a data storage element disposed substantially at the focal point of said beam, said storage element being exposed to the action of said beam to produce discrete areas of metal on the surface of said storage element in response to the primary effects of said beam.

6. In a data storage system, the combination comprising an electron microscope optical system including at least an electron source and an objective lens assembly for producing a high density beam of charged particles focussed to a diameter below the lateral resolution of visible light optical devices, a photographic data storage element disposed substantially at the focal point of said beam and having a photographic emulsion on the surface thereof directly accessible to said beam, said storage element being exposed to the action of said beam to produce discrete exposed areas of photolized silver in response to the primary effects of said beam.

7. In a data storage system, the combination comprising an electron microscope optical system including at least an electron source and an objective lens assembly for producing a high density beam of charged particles focussed to a diameter below the lateral resolution of visible light optical devices, and a data storage element disposed substantially at the focal point of said beam and comprising an insulating medium having charge retaining depressions on its surface, said storage element being exposed to the action of said beam for directly capturing charged particles therefrom to produce electric charges in the depressions at discrete positions on the surface of said storage element in response to the primary effects of said beam.

8. In a data storage system, the combination comprising an electron microscope optical system including at least a source of charged particles and an objective lens assembly for producing a high density beam of charged particles focussed to a diameter of less than 400 angstrom units, and a data storage element disposed substantially at the focal point of said beam and in a position exposed to the action of said beam to alter the characteristic of said storage element at discrete positions.

9. In a data storage system, the combination comprising an electron microscope optical system including at least a source of charged particles and an objective lens assembly for producing a high density beam of charged particles focussed to a diameter of less than 400 angstrom units, a data storage element disposed substantially at the focal point of said beam in position to be exposed to the action of said beam to alter the characteristic of said storage element at discrete positions in response to the primary effects of said beam, and means for reflecting said beam before it strikes said storage element.

10. In a data storage system, the combination comprising beam forming means for producing a beam of charged particles, a data storage element disposed in the path of said beam, said storage element being exposed to the action of said beam to alter the characteristics of said storage element at discrete positions in response to the primary effects of said beam, and meam modifying means positioned between said beam forming means and said storage element for reducing the cross-sectional dimensions of said beam substantially below its original dimensions, said last named means including a short focal length lens element positioned closely adjacent to said storage element to establish a beam modifying field in the vicinity of said storage element, the distance between said lens element and said storage element being substantially less than the distance between said lens element and said beam forming means whereby a substantial demagnifying effect takes place.

11. In a data storage system, the combination comprising a source to produce a beam of charged particles having a diameter substantially that of said source, a data storage element positioned in the path of said beam, deflecting means for said particle beam positioned between said source and said storage element, means positioned between said deflecting means and said storage element to reduce the diameter of said beam and focus it on said storage element to produce a high current density writing probe of substantially smaller diameter than the beam emitted from said source, said last named means including a short focal length lens element positioned closely adjacent to said storage element for modifying said particle beam trajectory and to form the reduced diameter probe, the distance between said lens means and said storage means being substantially less than the distance between said lens and said source whereby a substantial beam demagnifying effect takes place, said probe producing discrete information bearing areas on said storage element by the primary effects of said reduced diameter beam, the magnitude of said discrete areas being substantially equal to that of the reduced beam diameter.

12. In a data storage system, the combination comprising a particle source to produce a beam of charged particles having a diameter substantially equal to the dimensions of said source, a data storage element positioned in the beam path, deflection means positioned along said beam path between said source and said storage element, means positioned between said storage element and said deflection means to reduce the diameter of said beam and form a high current density writing probe of a diameter substantially smaller than the beam emitted from said source to produce discrete information bearing areas on said storage element by the primary effects of said reduced beam, said last named means being positioned closely adjacent to said storage element and having a focal length such that the diameter of said beam is reduced to a magnitude below the resolution limit of light optical devices whereby the magnitudes of said discrete areas are substantially equal to that of the reduced beam diameter and are below the resolution of light optical devices, and means to pulse said beam selectively.

13. In a data storage apparatus, the combination comprising an electron gun for producing a beam of electrons of a given cross section, a storage element of polarized ferroelectric material positioned along the electron beam path, beam focussing means for demagnifying and reducing the cross section of said electron beam positioned along the beam path and including a short focal length electron lens positioned closely adjacent to said storage element for reducing the beam cross section, the distance between said electron lens and said storage element being substantially less than the distance between said electron lens and said gun whereby a substantial beam demagnifying effect takes place to produce a high current density electron probe to selectively polarize the dipoles of said storage means by the primary effect of said probe.

14. In a data storage system, the combination comprising beam forming means for producing a beam of charged particles, a data storage element disposed in the path of said beam, said storage element being exposed to the action of said beam to alter the characteristics of said storage element at discrete positions in response to the primary effects of said beam, and beam modifying means positioned between said beam forming means and said storage element for reducing the cross-sectional dimensions of said beam substantially below its original dimensions, said last named means including a short focal length lens element positioned closely adjacent to said storage element for establishing a beam modifying field in the vicinity of said storage element and reflecting means for reflecting said beam before it strikes said storage means, the distance between said lens element and said storage element being substantially less than the distance between said lens element and said beam forming means whereby a substantial beam demagnifying effect takes place.

15. In a data storage system, the combination comprising beam forming means for producing a beam of charged particles, a data storage element comprising a porous insulating material disposed in the path of said beam, said storage element being exposed to the action of said beam to produce discrete charged areas on the surface of said storage element in response to the primary effects of said beam, and beam modifying means positioned between said beam forming means and said storage element for reducing the cross-sectional dimensions of said beam substantially below its original dimensions, said last named means including a short focal length lens element positioned closely adjacent to said storage element to focus said beam on said storage element whereby charged particles are directly captured to produce said discrete areas, the distance between said lens element and said storage element being substantially less than the distance between said lens element and said beam forming means whereby a substantial beam demagnifying effect takes place.

16. In a data storage system, the combination comprising beam forming means for producing a beam of charged particles, a semi-conducting storage element disposed in the path of said beam, said storage element being exposed to the action of said beam to produce discrete areas of lattice dislocation in said storage element in response to the primary effects of said beam, and beam modifying means positioned between said beam forming means and said storage element for reducing the cross-sectional dimensions of said beam substantially below its original dimensions, said last named means including a short focal length lens element positioned closely adjacent to said storage element for establishing a beam modifying field in the vicinity of said storage element, the distance between said lens element and said storage element being substantially less than the distance between said lens element and said beam forming means whereby a substantial beam demagnifying effect takes place.

17. In a data storage system, the combination comprising beam forming means for producing a beam of positive metallic ions, a data storage element disposed in the path of said beam, said storage element being exposed to the action of said beam to produce discrete areas of metal on the surface of said storage element in response to the primary effects of said beam, and beam modifying means positioned between said beam forming means and said storage element for reducing the cross-sectional dimensions of said beam substantially below its original dimensions, said last named means including a short focal length lens element positioned closely adjacent to said storage element for focussing said ions onto the surface of said storage element whereby said ions lose their charge and the metallic particles adhere to said surface, the distance between said lens element and said storage element being substantially less than the distance between said lens element and said beam forming means whereby a substantial beam demagnifying effect takes place.

18. In a data storage system, the combination comprising beam forming means for producing a beam of charged particles, a data storage element disposed in the path of said beam, a source of vaporized hydrocarbons for producing a cloud of hydrocarbon vapor in the vicinity of said storage element, said storage element and said hydrocarbon vapor being exposed to the action of said beam to deposit hydrocarbon on the surface of said storage element at discrete positions in response to the primary effects of said beam, and beam modifying means positioned between said beam forming means and said said storage element for reducing the cross-sectional dimensions of said beam substantially below its original dimensions, said last named means including a short focal length lens element positioned closely adjacent to said storage element for focussing said beam on the surface of said storage element, the distance between said lens element and said storage element being substantially less than the distance between said lens element and said beam forming means whereby a substantial beam demagnifying effect takes place.

19. In a data storage system, the combination comprising beam forming means for producing a beam of charged particles, a photographic storage element disposed in tht path of said beam, and having a photographic emulsion on the surface thereof directly accesible to said beam, said storage element being exposed to the action of said beam to produce discrete exposed areas of photolized silver in response to the primary effects of said beam, and beam modifying means positioned between said beam forming means and said storage element for reducing the cross-sectional dimensions of said beam substantially below its original dimensions, said last named means including a short focal length lens element positioned closely adjacent to said storage element for establishing a beam modifying field in the vicinity of said storage element, the distance between said lens element and said storage element being substantially less than the distance between said lens element and said beam forming means whereby a substantial beam demagnifying effect takes place.

20. In a data storage system, the combination comprising beam forming means for producing a beam of charged particles, a data storage element disposed in the path of said beam and comprising an insulating medium having charge retaining depressions on its surface, said storage element being exposed to the action of said beam for directly capturing charged particles therefrom to produce electric charges in the depressions on the surface of said storage element in response to the primary effects of said beam, charge redistribution preventing means positioned on the surface of said insulating medium for preventing leakage over the surface of said insulating medium, and beam modifying means positioned between said beam forming means and said storage element for reducing the cross-sectional dimensions of said beam substantially below its original dimensions, said last named means including a short focal length lens element positioned closely adjacent to said storage element for focussing said beam on the surface of said storage element, the distance between said lens element and said storage element being substantially less than the distance between said lens element and said beam forming means whereby a substantial beam demagnifying effect takes place.

21. In a data storage system having an electron microscope optical system including at least an electron source and an objective lens assembly for producing a high density beam of electrons focussed to a diameter less than 400 angstrom units, a data storage element positioned substantially at the focal point of said beam, said storage element being exposed to the action of said beam to alter the characteristics of said storage element at discrete positions in response to the primary effects of said beam.

22. In a data storage system having an electron microscope optical system including at least an electron source and an objective lens assembly for producing a high density beam of electrons focussed to a diameter less than the the lateral resolution of visible light optical devices, a data storage element positioned substantially at the focal point of said beam, said storage element comprising a porous glassy material, said pores functioning as charge retaining members for directly capturing charged particles from a focussed beam and which are small relative to the spot diameter of said beam, a charge redistribution preventing a metallic layer adhering to the surface between said pores for preventing charged redistribution by leakage of the charged particles over the surface of said insulating medium, discrete groups of said pores being electrically charged by direct electron capture to produce a charge pattern representative of stored data.

23. In a data storage system having an electron microscope optical system including at least a source of charged particles and an objective lens assembly for producing a high density beam of charged particles focussed to a diameter below the lateral resolution of optical devices, a data storage element disposed substantially at the focal point of said beam, said storage element comprising a medium having discrete areas of irradiated solid hydrocarbons positioned on the surface of said medium in the form of information bearing matrices.

24. In a data storage system having an electron microscope optical system including at least an electron source and an objective lens assembly for producing a high density beam of electrons focussed to a diameter less than 400 angstrom units, a photographic data storage element positioned substantially at the focal point of said beam, said storage element comprising a supporting element of grid-like construction, a surface layer of photographic emulsion positioned on said supporting means and directly accessible to said particle beam, said layer having a thickness substantially equal to the data resolution desired.

References Cited in the file of this patent

UNITED STATES PATENTS

| | | |
|---|---|---|
| Re. 24,070 | Pierce | Oct. 4, 1955 |
| 2,206,415 | Marton | July 2, 1940 |
| 2,527,632 | Graham | Oct. 31, 1950 |
| 2,547,386 | Gray | Apr. 3, 1951 |
| 2,572,858 | Harrison | Oct. 30, 1951 |
| 2,656,485 | Page | Oct. 20, 1953 |
| 2,692,532 | Lawrence | Oct. 26, 1954 |
| 2,785,328 | Kihn | Mar. 12, 1957 |
| 2,793,288 | Pulvari | May 21, 1957 |
| 2,837,643 | Goodwin et al. | June 3, 1958 |
| 2,844,722 | Hines | July 22, 1958 |
| 2,859,376 | Kirkpatrick | Nov. 4, 1958 |
| 2,863,088 | Barbier | Dec. 2, 1958 |
| 2,863,089 | Barbier | Dec. 2, 1958 |
| 2,871,398 | Chruney | Jan. 27, 1959 |
| 2,872,612 | De Lano et al. | Feb. 3, 1959 |
| 2,875,373 | Ketchledge | Feb. 24, 1959 |
| 2,908,836 | Henderson | Oct. 13, 1959 |
| 2,915,660 | McNaney | Dec. 1, 1959 |
| 2,937,312 | Schlesinger | May 17, 1960 |

OTHER REFERENCES

Zworykin et al.: "A Scanning Electron Microscope," A.S.T.M. Bull., No. 117, pp. 15–23, August 1942.

Spangenberg: "Vacuum Tubes," McGraw-Hill Book Co., 1949.

Mutter: "Improved Cathode-Ray Tube for Application in "Williams Memory System," Electrical Engineering, pages 352–356. April 1952.